Figure 1:
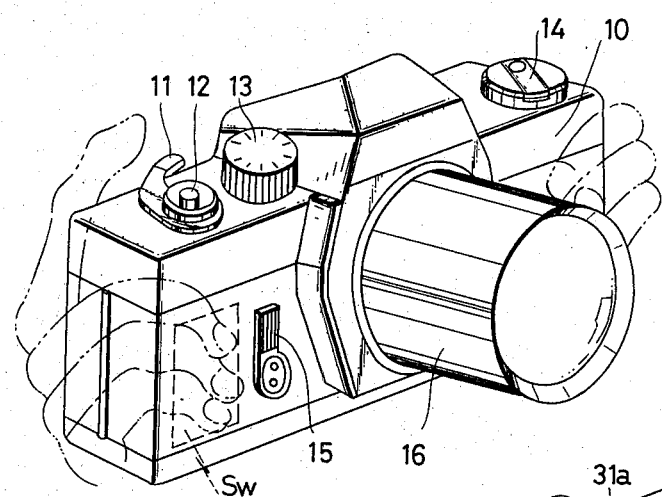

United States Patent [19]
Kuramoto

[11] 3,868,700
[45] Feb. 25, 1975

[54] ELECTRIC EXPOSURE CONTROL CAMERA

[75] Inventor: Yoshio Kuramoto, Osaka, Japan

[73] Assignee: Minolta Camera Kabushiki Kaisha, Osaka, Japan

[22] Filed: Feb. 9, 1973

[21] Appl. No.: 331,131

[30] Foreign Application Priority Data
Feb. 12, 1972 Japan.............................. 47-14982

[52] U.S. Cl................................... 354/23, 354/288
[51] Int. Cl............................................. G03b 7/08
[58] Field of Search.... 95/31 EL, 11 R, 10 C, 53 E; 352/166; 200/159 A, 165; 354/23, 50, 288, 289

[56] References Cited
UNITED STATES PATENTS

| | | | |
|---|---|---|---|
| 1,614,887 | 1/1927 | Hill | 200/159 A X |
| 3,418,909 | 12/1968 | Rabinow | 95/11 R X |
| 3,439,596 | 4/1969 | Peterson et al. | 95/11 R |
| 3,452,658 | 7/1969 | Krull et al. | 95/10 C X |
| 3,590,331 | 6/1971 | Kirsch | 200/159 A X |
| 3,599,548 | 8/1971 | Hennig | 95/11 R |
| 3,693,524 | 9/1972 | Furuta | 95/31 EL |
| 3,736,395 | 5/1973 | Miller | 200/159 A |

Primary Examiner—Samuel S. Matthews
Assistant Examiner—Kenneth C. Hutchison
Attorney, Agent, or Firm—Wolder & Gross

[57] ABSTRACT

Electric exposure control camera so adapted that the exposure control circuit is established merely when the camera body is held for photographing. A plate member for actuating the movable contact of the pressure sensing switch is arranged in the casing wall so as to be substantially flush therewith, at the area on which the tip of any finger is naturally placed depending on dimension, configuration of the camera as a whole, and arrangement or positions of the outside components such as the lens barrel, finder, shutter button and the like.

9 Claims, 8 Drawing Figures

ELECTRIC EXPOSURE CONTROL CAMERA

The present invention relates to an electric exposure control camera so adapted that the exposure control circuit is established merely when the camera body is manually held for photographing.

Recently various types of electric shutter cameras have been provided in which a photoelectric element such as CdS cell is used for electrically controlling exposure time. In these cameras a battery must be naturally used as current source. Thus it is necessary for ensuring satisfactory operation of the exposure control always to check carefully to see if the battery has been consumed in order to keep the battery life as long as possible. Especially in an electric shutter camera having a so-called TTL system in which light impinging through the phototaking lens is detected for the exposure control, considerable electric energy is consumed so that the battery is often completely discharged in a few days when the power switch is forgetfully left closed. This is because the light detection can not be made during the exposure in such cameras so that it is necessary to memorize the result of the detection made just before releasing the shutter, which is then closed under the control of the memory circuit, which usually necessitates an additional constant-current circuit.

In order to save consumption of the electric energy, it might be taken into consideration to improve the related circuit. Actually various improvements have been proposed, but there is naturally a technical limitation in such improvements. Thus it becomes necessary to make the time as short as possible during which the circuit is closed. Theoretically it is sufficient therefor to actuate the power switch manually so as to establish the circuit only when it is necessary. This manual actuation of the switch, however, is often forgotten.

It is most simple and reliable for avoiding such forgetfulness to design the shutter button so that pushing the shutter button down a little may close the switch and further pushing down may realize the actual shutter release. This has been actually applied to some cameras available now in the market but found unsatisfactory in the following aspect. As is well known it is often desired to manually control the shutter speed or the diaphragm opening in a camera having automatic exposure control. In order to read the detected value of the subject light intensity from the exposure meter for that purpose it would be necessary in this sort of camera to slightly push the shutter button down for closing the exposure meter circuit. When it is intended to manually change the set shutter speed or the set diaphragm opening, the release button must be again pushed down a little. This is not only troublesome but also often causes accidental excessive pushing-down of the release button which of course actually releases the shutter.

In view of the defects referred to above, it has been proposed to utilize the film winding-up lever. Some cameras are provided with such a lever adapted to be manually angularly moved so that one angular movement thereof may cause winding-up of the film by one frame. In such a film-winding lever, there is generally a certain amount by which the lever may be angularly moved without affecting the film winding. The Japanese Official Gazette of Utility Model Publication No. 23,822/1965 teaches the design of such a film-winding lever to be utilized for closing and opening the current source switch to establish the circuit for energizing the electric exposure control. When the lever occupies the normal position the switch is open, but when the lever is angularly moved by a certain angle the switch is closed. This is not satisfactory in that when the photographer returns the lever after the film-winding, it may require excessive actuation to move the lever to the normal position to open the electric source switch.

Further it has been proposed in U.S. Pat. No. 3,582,200 to provide a yoke on the rear side of the hand grip for a cinematographic camera so that when the cinecamera is held the yoke may be naturally pressed for closing the battery switch. This is, however, unsatisfactory from the point of view of human engineering. Such a yoke is to be pressed not by the fingers but by the palm portion of the hand, which would not always reliably press the yoke, depending on the gripping mode. Furthermore this is constructionally complex.

The present invention has an object to avoid and overcome the defects referred to above in the prior art mechanisms so that the current source switch may be completely reliably opened with a very simple arrangement or construction.

Said object can be attained according to the invention by providing a normally open switch arranged on the camera casing and in the electric exposure control circuit so that the tip of a finger of the hand may be naturally positioned on said switch and may naturally press the movable contact of the switch against the spring force to establish said circuit, when the camera body is held for photographing.

There are various types of cameras in view points of dimension and configuration of the camera as a whole, and arrangement or positions of the outside components such as the lens barrel, finder, shutter button and the like, which determine the area and posture the photographer's hand or hands naturally engage on the casing when holding the camera when taking photos. As a result of many experiments it has been found that any one hardly will or rather can hold the camera on any unexpectedly fanciful area or in any unexpectedly strange hand posture. The present invention is based on this finding. From this area and posture of the hand the position of the finger tip on the camera casing is to be naturally determined. Around this position the movable contact of the normally open switch is provided so as to usually interrupt the current source from the loading of a light detecting circuit for preventing useless consumption of electric energy. When the camera is held for photographing, the finger tip to be put on said movable contact naturally closes the switch for establishing the light detecting circuit, whereby the automatic exposure control camera is ready for phototaking. When the photographer looses his hold on the camera, then the switch opens without fail. Said movable contact or a related member for actuating such contact would have to be so arranged that it will not be accidentally actuated when the camera is laid on something or contained in a bag or the like.

Figure 2:
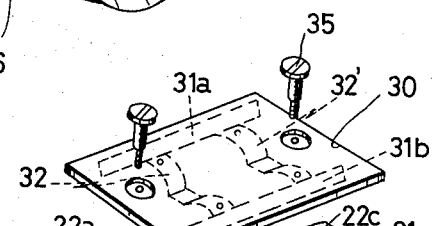
Figure 3:
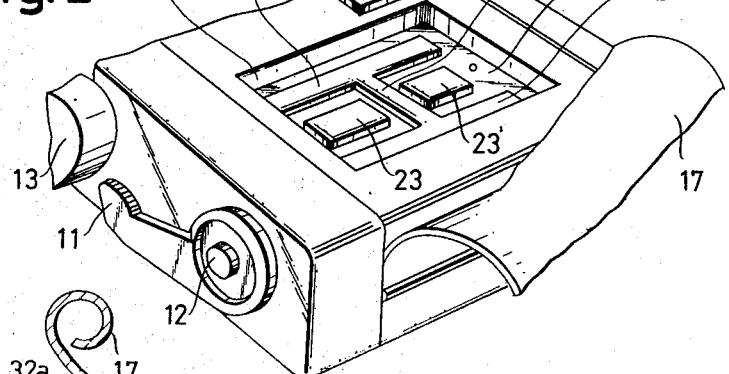
Figure 4:
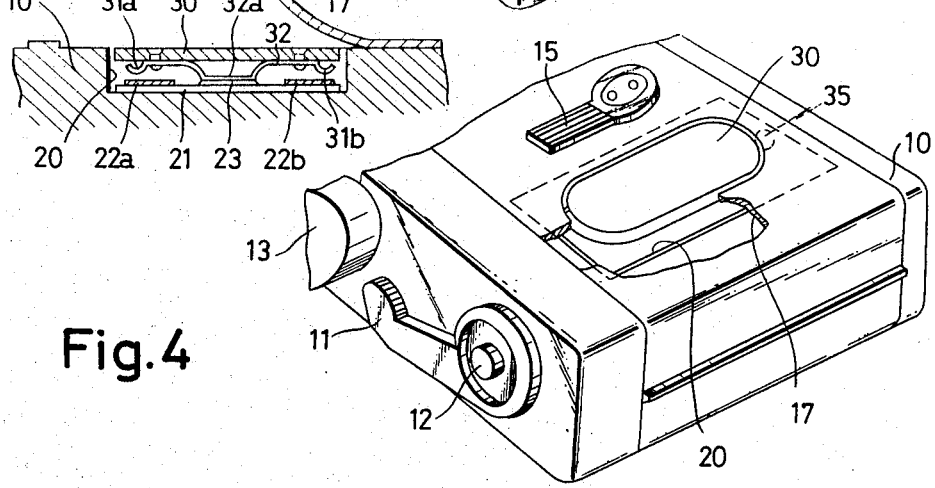
Figure 7:
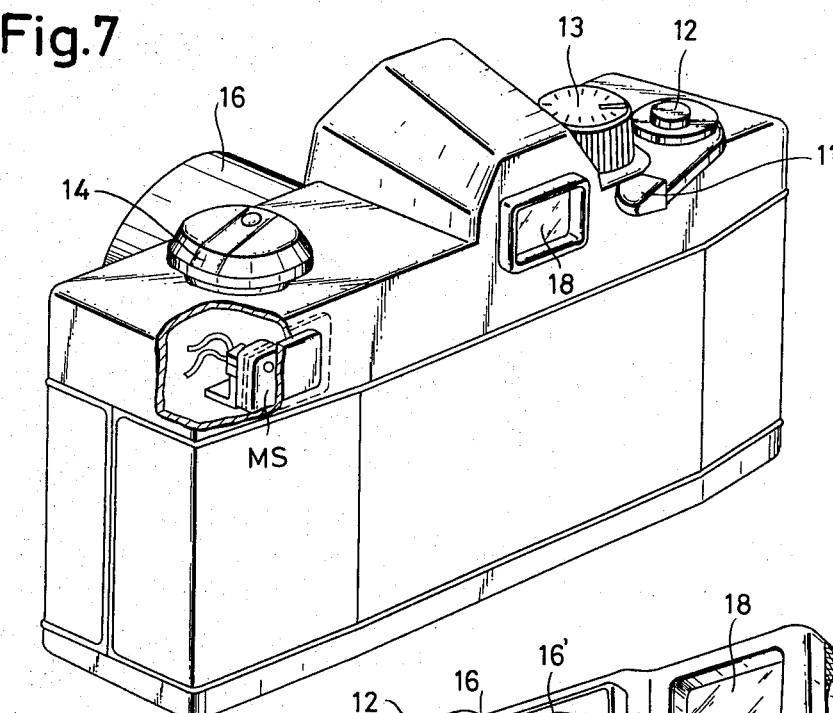
Figure 5:
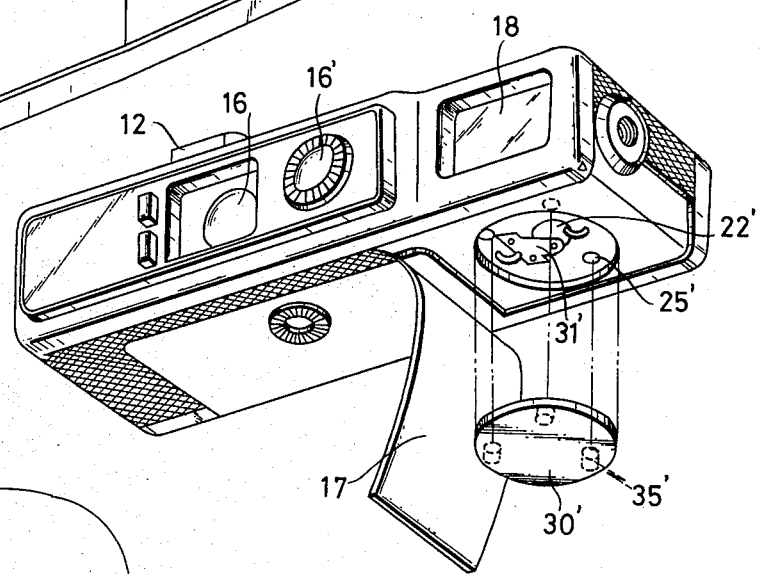
Figure 6:
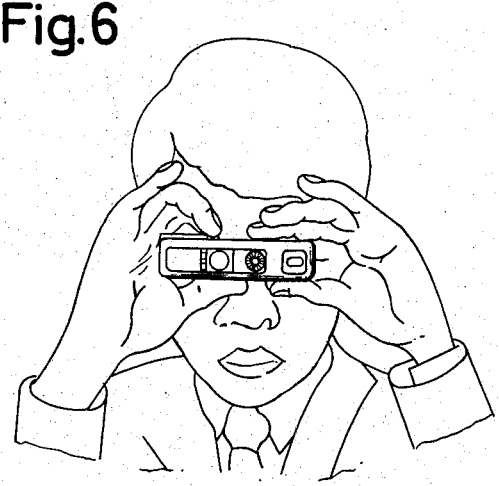
Figure 8:
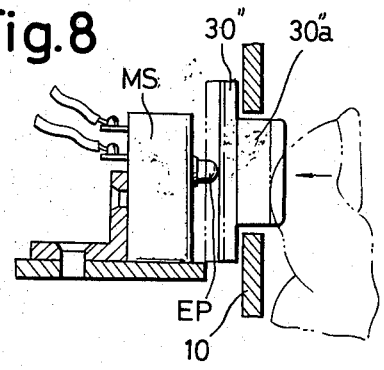

The present invention shall be explained in more detail and definitiveness according to some preferred embodiments in reference to the accompanying drawings, in which;

FIG. 1 is a perspective view of a single-lens reflex camera provided with the switch according to the first embodiment of the invention, FIG. 2 is a perspective view of a portion of the camera of the type described above for showing the switch in the exploded condition, FIG. 3 is a section taken along line III—III in FIG. 2 showing the switch in its normal open condition as well as a sheet leather covering to be extendedly fixed over the movable contact of the switch, FIG. 4 is a view similar to FIG. 2 but showing a slight modification in which the movable contact is exposed without covering by the sheet leather, FIG. 5 is a perspective view of a small 16 mm camera provided with the switch according to a second embodiment in an exploded view similar to FIG. 2, FIG. 6 is a view showing a manner of holding the camera of FIG. 5 for phototaking, FIG. 7 is a perspective view of a single-lens reflex camera provided with a conventional microswitch which is arranged in a different position according to a third embodiment, the camera casing wall being partly cut out for showing how the switch is mounted, and FIG. 8 is a section of the area where the switch of FIG. 7 is provided for showing actuation thereof by the tip of the left thumb when holding the camera.

In FIG. 1 there is shown a typical single-lens reflex camera generally represented by 10 which has a film winding-up lever 11, a shutter button 12, a dial for exposure time selection 13, a film rewinding knob 14 arranged on the upper wall of the camera casing, a self-timer set lever 15, and a lens barrel 16 arranged on the front wall. Due to the relatively large dimension and relatively heavy weight of the camera as a whole as well as the arrangement of the components referred to above, the position of the fingers would usually be as shown by phantom lines. Taking into consideration the position of the three smaller fingers of the right hand, the switch Sw is arranged on the front wall as shown also by phantom lines.

In FIG. 2, a piece of sheet leather for covering the metal casing wall is represented by 17. The camera casing has a recess 20 formed in the front wall thereof. The bottom of recess 20 is defined by an insulation board 21 on which a substantially H-shaped conductor is arranged or printed, which consists of two longitudinal bars 22a, 22b and one transverse bar 22c connecting the two longitudinal bars. Two conductor pieces 23 and 23' are also arranged or printed on insulation board 21 respectively at the upper and lower spaces of the "H." The movable contact comprises an insulation board represented by 30 and designed to be snugly fitted in recess 20. On board 30 there is provided a conductor member consisting of two longitudinal brs 31a, 31b arranged in parallel with each other and two transverse bars 32, 32' arranged in parallel with each other and respectively connecting the two longitudinal bars. This conductor member may be mounted on the insulator board 30, for instance by means of rivets 33 at four portions.

As best shown in FIG. 3, each of the longitudinal bars 31a, 31b is bent along the length thereof so as to respectively make good electric contact with each of the longitudinal bars 22a of the H-shaped conductor. Each of said two transverse bars 32, 32' of the movable contact is bent to form a projection 32a (32'a) at the center of the length so as rest on the respective conductor piece 23 or 23' in assembly to be electrically contacted therewith. At the usual position of the switch, said protruded portions 32a and 32'a are restingly contacted respectively with the conductor pieces 23 and 23', but the longitudinal bars 31a and 31b are kept apart a little respectively from the longitudinal bars 22a and 22b of the H-shaped conductor. When the camera is held for photographing with the tip of any one of the fingers on the area of said insulation board 30, the manual pressure would push down said board 30 via the sheet leather 17, and consequently the conductor member fixed therewith into the recess 20 against the elastic force of the transverse bars 32 and 32', so that the longitudinal bars 31a and 31b may be electrically contacted respectively with the longitudinal bars 22a and 22b. There is no need for explaining electrical connection of said switch. It would be sufficient therefor merely to say that at least a light detecting circuit for detecting light from an object to be photographed through the objective is connected thereby with the current source merely when said movable contact is pressed down.

In order to achieve smooth guiding of the movable contact in the recess 20, it is preferable to provide a guide pin 35 having an enlarged head, inserted into a hole formed in the upper insulation board 30 so that the free end thereof is located on the lower insulation board 21, for allowing the movable contact to move vertically along said guide pin. In this embodiment two pins are provided.

In FIG. 4 there is illustrated a slight modification of the above embodiment in which the insulation board 30 of the movable contact is covered with the sheet leather referred to above. According to this modification, the insulation board 30 is partly, elliptically exposed without coverage by the sheet leather for clearly showing the position of the switch.

In FIGS. 5 and 6 there is illustrated the second embodiment applied to a 16 mm camera. A small camera such as a 16 mm camera which has a taking lens 16, a lens 16' for receiving light to be measured for automatic exposure control, a finder 18 on the thin front wall, and a shutter button 12 on the upper wall, is generally held as illustrated in FIG. 6.

In FIG. 5 a circular recess 20' is formed in the lower wall of the casing. The bottom of said recess is defined by an insulation board or sensor plate 21' on which there are provided two conductor pieces 22' and 31' so that said two are usually separated a little but when pressing the latter said two may be electrically contacted. A disk of insulating material 30' has three pins 35' positioned thereon. In the insulation board 21' there are formed three holes 25' so that when said disk 30' is snugly fitted in said recess 20' each of said holes 25' may receive a respective pin 35' to guidingly allow the vertical movement of said disk 30'. The upper surface of said disk 30' is designed so as to be substantially flush with the outer surface of the casing wall. Thus when the sheet leather 17 is covered, the normally open switch is assembled. If the camera is held for photographing as shown in FIG. 6, the thumb of the left hand would be put on the area of said switch to press the disk 30' into the recess 20' against the elastic force of the conductor piece 31' which is yieldingly contacted with the other conductor piece 22', whereby at least the light detecting circuit is established.

The single-lens reflex camera as shown in FIG. 1 is held often not in the position illustrated therein but in the vertical position, in which the thumb of the left hand would be put on the left and upper corner of the back wall of the casing. FIGS. 7 and 8 show a third embodiment, in which a conventional microswitch readily available in the market is provided at this corner. In FIG. 7, a perspective view of the camera similar to that shown in FIG. 1 but showing the back wall, outer components 11, 12, 13, 14 and 16 have been explained. A finder is represented by 18.

The microswitch MS has a feeler pin FP as shown in FIG. 8 so that when it is pressed against the elastic force of the spring means not shown the normally open switch is adapted to be closed. No explanation nor illustration of the construction and operation of the switch is required since they are well known. The microswitch MS is provided in the camera casing at the portion referred to above so that said pin FP is directed toward the back wall of the casing which is partly cut out to fittingly receive a protruded portion 30"a of a sensor plate 30" which may be made by metallic material.

When the camera is held in the vertical position for photographing, the left thumb is put on the protruded button 30"a to press it as shown by an arrow, namely to the left in the drawing. In the pressed position of said protruded button 30"a and of the sensor plate 30" illustrated by phantom lines, the latter would press the feeler pin FP so as to close the switch MS whereby at least the light detecting circuit is established.

The embodiments explained above and illustrated in the drawings have been given merely for the purpose of explanation of the invention. It should be noted that the scope of the invention is not limited thereto but various modifications and changes may be made.

For instance, two or more switches arranged in parallel may be provided for more reliably ensuring the circuit establishment. Of course the area on which the switch is provided would not be limited to the above embodiments.

What is claimed is:

1. In a photographic camera including a camera casing, a light detecting circuit for detecting light from an object to be photographed, an indication means for indicating exposure value corresponding to the output of said light detecting circuit, an electric shutter circuit for controlling an exposure in accordance with the output of said light detecting circuit, a current source for energizing at least said light detecting circuit, a normally open switch arranged between said current source and said light detecting circuit, a switch operating member for closing said normally open switch, and a shutter release member for initiating shutter mechanism, the improvement wherein said switch operating member comprises a sensor plate responsive to pressure thereon to close said switch, said sensor plate arranged on and extending over said camera casing at an area where the tip of any finger or thumb of a hand which holds the camera casing naturally put when a person who operates the camera holds the casing for photographing by means of one hand with the other hand permitted to move for the operation of said shutter release member, said sensor plate being disposed on a wall of said camera different from that of said shutter release member.

2. A photographic camera as claimed in claim 1, wherein said camera is a small size camera constructed so that the operator may hold upper and lower walls of the casing by means of at least one hand during photographing, said shutter release member being arranged in said upper wall.

3. A photographic camera as claimed in claim 1, further comprising a film winding-up lever arranged in an upper wall of said camera casing adjacent to a right side edge of said upper wall with respect to the operator's position, and wherein said release member is arranged in said upper wall adjacent to said film winding-up lever, and said sensor plate is arranged in a backwall of said camera casing at left upper corner thereof, whereby left hand of the operator may hold the camera with the thumb thereof pushing (or depressing) said sensor plate while the right hand may be prepared for the operation of said shutter release member and said film winding-up lever.

4. In a photographic camera including a camera casing, a light detecting circuit for detecting light from an object to be photographed, an indication means for indicating exposure value corresponding to the output of said light detecting circuit, an electric shutter circuit for controlling an exposure in accordance with the output of said light detecting circuit, a current source for energizing at least said light detecting circuit, a normally open switch arranged between said current source and said light detecting circuit, a switch operating member for closing said normally open switch, and a shutter release member for initiating shutter mechanism, the improvement wherein said switch operating member comprises a sensor plate responsive to pressure thereon to close said switch, said sensor plate being arranged on and extending over said camera casing at an area where the tip of any finger of at least one of the hands which holds the camera casing is naturally put when a person who operates the camera holds the casing for photographing by means of the fingers of said hand other than that free for the operation of said shutter release member, said sensor plate being disposed on a wall of said camera casing different from that of said shutter release member.

5. A photographic camera as claimed in claim 4, wherein said camera is of a type constructed so that the operator may hold the front and back walls of the casing by means of at least one hand during photographing, said shutter release member is arranged in upper wall of the camera to be operated by said free finger of the camera holding hand, said camera has a lens barrel arranged at a central portion of the front wall of the camera, and said sensor plate is mounted at the front wall between said lens barrel and a side edge of the front wall.

6. A photographic camera as claimed in claim 5, wherein said camera further comprises a film winding up lever arranged in an upper wall of said camera casing adjacent to said shutter releasing member to be operated by a thumb of the hand that holds the camera with the thumb free.

7. In a single lens reflex camera including a camera casing, a light detecting circuit for detecting light from an object to be photographed through an objective, an indication means for indicating exposure value corresponding to the output of said light detecting circuit, a memory circuit for memorizing the output of said light detecting circuit, an electric shutter circuit for controlling an exposure in accordance with the output memorized in said memory circuit, a current source for energizing at least said light detecting circuit, a release member for initiating shutter mechanism, a normally open switch arranged between said current source and said light detecting circuit, and switch operating member for closing said normally open switch, the improvement wherein said switch operating member comprises a sensor plate responsive to pressure thereon to close said switch, said sensor plate being arranged in and extending over a wall of said camera casing at an area where the tip of any finger of at least one of the hands which hold the camera casing is naturally put when a person who operates the camera holds the casing for photographing by means of the fingers of the hand other than that free from the operation of said shutter release member, said sensor plate being disposed on a wall of said camera different from that of said shutter.

8. A single lens reflex camera as claimed in claim 7, wherein said camera is of a type constructed so that the operator may hold the front and back walls of the casing by means of at least one hand during photographing, said shutter release member is arranged in upper wall of the camera to be operated by said free finger of the camera holding hand, said camera has a lens barrel arranged at a central portion of the front wall of the camera, and said sensor plate is mounted at the front wall between said lens barrel and a side edge of the front wall.

9. A single lens reflex camera as claimed in claim 8, wherein said camera further comprises a film winding up lever arranged in an upper wall of said camera casing adjacent to said shutter releasing member to be operated by a thumb of the hand that holds the camera with the thumb free.

* * * * *